United States Patent [19]

Bousmar et al.

[11] 4,130,724
[45] Dec. 19, 1978

[54] DATA RECEIVER WITH SYNCHRONIZING SEQUENCE DETECTION CIRCUIT

[75] Inventors: Michel A. M. J. Bousmar; Michel J. P. Christiaens, both of Brussels, Belgium

[73] Assignee: U.S. Philips Corporation, New York, N.Y.

[21] Appl. No.: 795,877

[22] Filed: May 11, 1977

[30] Foreign Application Priority Data

May 18, 1976 [NL] Netherlands .......................... 7605275

[51] Int. Cl.² .............................................. H04L 7/00
[52] U.S. Cl. ....................................... 178/69.1; 178/88
[58] Field of Search ...................... 178/69.1, 88, 66 R; 325/42, 41, 46, 363, 364, 478, 466, 348; 333/18

[56] References Cited
U.S. PATENT DOCUMENTS

| | | | |
|---|---|---|---|
| 3,564,419 | 2/1971 | Yackish | 325/478 |
| 3,902,123 | 8/1975 | Oomen | 325/348 |
| 3,978,407 | 8/1976 | Forney, Jr. et al. | 325/42 |
| 4,063,244 | 12/1977 | Van de Kop | 178/69.1 |

*Primary Examiner*—Robert L. Griffin
*Assistant Examiner*—Michael A. Masinick
*Attorney, Agent, or Firm*—Thomas A. Briody; William J. Streeter; Henry I. Steckler

[57] ABSTRACT

A data receiver with synchronizing-sequence detection circuit which comprises a bandpass filter for selecting a channel signal component of carrier frequency $f_c$, a zero-crossing detector, pulse interval measuring means and a pulse pattern analyzer, which detection circuit detects on the basis of the substantially constant period duration of $f_c$ the synchronizing period associated with the synchronizing sequence of which detects on the basis of the no longer constant period duration of $f_c$ the training period following after the synchronizing period.

4 Claims, 7 Drawing Figures

DATA RECEIVER WITH SYNCHRONIZING SEQUENCE DETECTION CIRCUIT

The invention relates to a receiver for a data transmission system in which data signals are transmitted in the form of a channel signal which is obtained by means of double sideband quadrature modulation of a carrier wave and in which prior to the data signals a synchronizing sequence is transmitted which comprises a synchronizing period and an immediately subsequent training period for effecting in the receiver an initial synchronization of local oscillators and a correct preadjustment of an adaptive equalizer respectively, the spectrum of the channel signal during the synchronizing period consisting of a spectral line at the carrier frequency $f_c$ and two spectral lines which are situated symmetrically relative to $f_c$, whereas this spectrum during the training period consists of a spectral line at the carrier frequency $f_c$ with a phase which is opposite to that of $f_c$ during the synchronizing period and a plurality of spectral lines which are symmetrical relative to $f_c$, which receiver comprises a detection circuit coupled to the receiver input for producing an output signal which, starting from a first value assumes a second value during reception of the synchronizing period and which again assumes the first value on receipt of the training period and the subsequent data signals.

Double sideband quadrature carrier modulation represents a class of known modulation technique such as multiple phase-shift-keying, quadrature amplitude modulation and combined amplitude-shift and phase-shift-keying.

In the receiver the output signal of said detection circuit is utilized for a number of switching functions. So the transition from the first value to the second value of this output signal is inter alia used to switch the phase-locked loop for recovering the carrier over to a smaller noise bandwidth and to effect a rapid initial phase synchronization of the local clock signal generator whereas the transition from the second value to the first value of this output signal is inter alia used to put the adaptive equalizer in its operating condition.

The training period immediately follows after the synchronizing period and is constituted by two different combinations of amplitude and phase values of the carrier signal which combinations occur in randomly changing succession. The beginning of the training period, however, is formed by a predetermined one of said two different combinations. Therefor, in order to obtain a correct and rapid presetting of the adaptive equalizer it is required that this equalizer is brought in its operating condition at the correct moment. A prior art method for detecting the synchronizing period and the training period utilizes the fact that during the synchronizing period the energy of the received channel signal is mainly distributed over the spectrum component of carrier frequency $f_c$ and the two spectrum components which are symmetrical relative thereto, whereas during the training period and the subsequently received data signals the energy is distributed over the entire frequency band. When using a band-pass filter whose passband is chosen so that the energy passed by the filter is very low during the synchronizing period and strongly increases as soon as the training period begins it is now possible to determine, by means of a simple energy measurement and comparison the receipt of the synchronizing period and the transition from synchronizing period to training period.

This prior art method which is based on energy measurement has, however, the disadvantage that the transition from synchronizing period to training period cannot be followed rapidly enough by the band-pass filter so that transition phenomena are introduced which are the cause that the moment at which the transition takes place is detected with a certain delay.

In addition, this prior art detection method is sensitive to the transmission path attenuation increasing with frequency so that the detection circuit should be carefully adjusted.

It is an object of the invention to provide a receiver of the kind described in the preamble having a detection circuit coupled to the receiver input, which mitigates the above-mentioned disadvantages.

In accordance with the invention the detection circuit for such a receiver comprises a band-pass filter for selecting a channel signal component at $f_c$, a zero-crossing detector connected to this filter for generating output pulses at the zero crossings of said channel signal component, pulse interval measuring meter means having first and second outputs and being connected to the zero crossing detector for measuring the interval between successive output pulses thereof, to produce a pulse at its first output each time the length of the interval measured is within a predetermined range, and to produce a pulse at its second output each time the length of the interval measured is outside said predetermined range and a pulse pattern analyzer connected to said first and second outputs of the pulse interval measuring means to produce the output signal of said first value which, after a prescribed pattern of successive pulses has occurred at least once at the first output of the pulse interval measuring means assumes said second value, and which again assumes the first value in response to the occurrence of a pulse at the second output of the pulse interval measuring means.

When using the measures according to the invention the instant at which the training period starts is determined with great accuracy since due to the phase reversal of the carrier component $f_c$ selected by means of the band-pass filter, the selected component during the training period shows rather strong phase fluctuations which are not present during the preceding synchronizing period.

The pulse-interval measurement used as a detection criterion is exclusively based on the information present in the center of the received line spectrum on which the distortion, introduced by the transmission path, has little influence.

The invention and its advantages will be further explained with reference to the drawing, of which FIG. 1 shows a data receiver with a possible embodiment of the synchronizing sequence detection circuit according to the invention;

Figure 1:
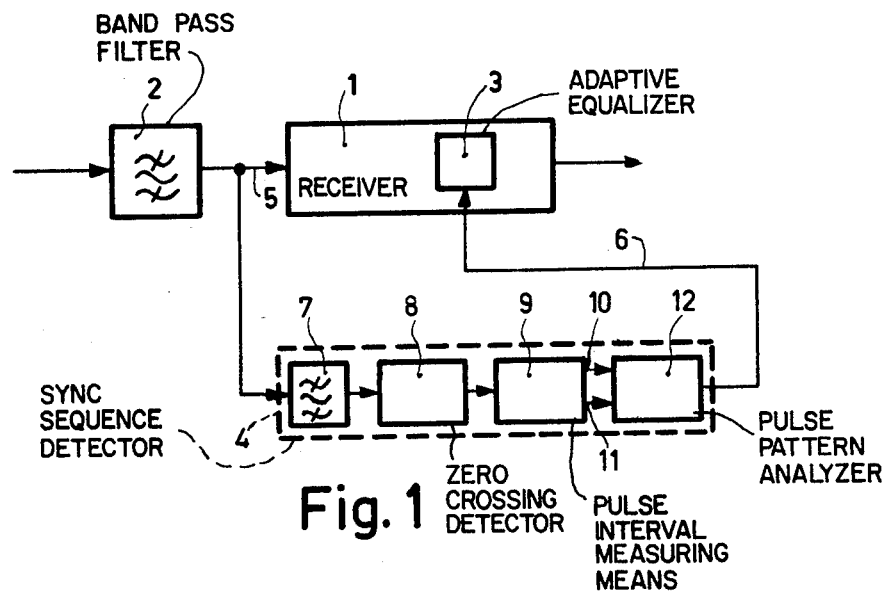
Figure 2:
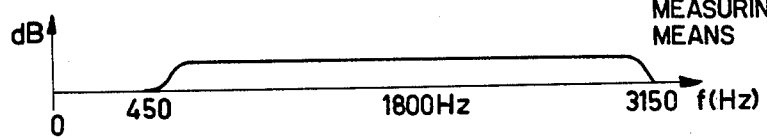
FIG. 2 shows the line spectrum of the channel signal during data reception.

Referring to FIG. 1, there is shown a receiver 1 for receiving data signals transmitted in the form of a channel signal and obtained by means of double sideband quadrature modulation of a carrier wave. The channel signal is supplied to the receiver 1 via a bandpass filter 2 whose passband, extends, as shown in FIG. 2, from 450 Hz to 3150 Hz for a carrier frequency $f_c$ at 1800 Hz. During the reception of data signals the carrier synchronization and the bit synchronization as well as the required equalization are effected by means of signals which are derived from the data signals received. These signals, however, cannot be derived unless, prior to the reception of the data signals, an initial synchronization of a local carrier oscillator and clock signal generator as well as a correct presetting of an adaptive equalizer 3 has taken place in the receiver. To this end it is customary that prior to the data signals a synchronization sequence is transmitted which comprises a synchronizing period and an immediately adjacent training period by means of which said initial synchronization and equalizer preadjustment respectively are effected.

Figure 3:
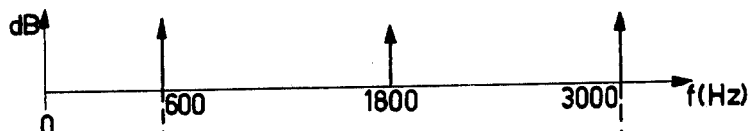
FIG. 3 shows the line spectrum of the channel signal during the synchronizing period.
Figure 4:
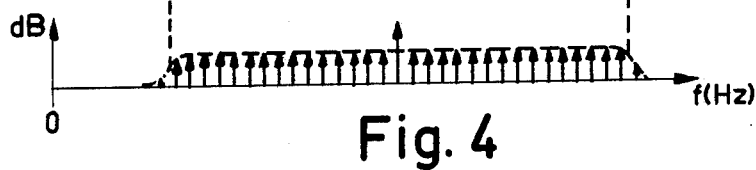
FIG. 4 shows the line spectrum during the training period.

During the synchronizing period the line spectrum of the channel signal received consists, as shown in FIG. 3 of a spectral line at the carrier frequency $f_c = 1800$ Hz and two spectral lines at 600 and 3000 Hz, which are located symmetrically relative to $f_c$, whereas this spectrum during the training period, as shown in FIG. 4, consists of a spectral line at the carrier frequency $f_c = 1800$ Hz with a phase which is opposite to that of $f_c$ during the synchronizing period and a large number of spectrum lines which are symmetrical relative to $f_c$.

To obtain a proper preadjustment of the adaptive equalizer 3 it is furthermore essential that the equalizing procedure starts at the correct instant i.e. as soon as the training period begins. To this end the receiver is provided with a synchronization-sequence detection circuit 4 which is connected to the receiver input 5 and which produces an output signal which, starting from a first value assumes a second valve during reception of the synchronizing period and which again assumes the first value on receipt of the training period and the subsequent data signals. The output signal of said second value being applied, as a starting signal via lead 6 to the adaptive equalizer 3. In accordance with the invention a starting signal which coincides accurately with the beginning of the training period is obtained when said detection circuit comprises a bandpass filter 7 for selecting a channel signal component at $f_c$, a zero crossing detector 8 connected to this filter for generating output pulses at the zero crossings of said channel signal component, a pulse interval measuring means 9 having first and second outputs 10 and 11, and being connected to the zero crossing detector for measuring the interval between successive output pulses thereof, to produce a pulse at its first output 10 each time the length of the interval measured is within a predetermined range and to produce a pulse at its second output 11 each time the length of the interval measured is outside said predetermined range, and a pulse pattern analyzer 12 connected to said first and second output 10 and 11 of the pulse interval measuring means 9 to produce the output signal of said first value which after a prescribed pattern of successive pulses has occurred at least once at the first output 10 of the pulse interval measuring means 9 assumes said second value, and which again assumes the first value in response to the occurrence of a pulse at the second output 11 of the pulse interval measuring means 9.

Figure 6:
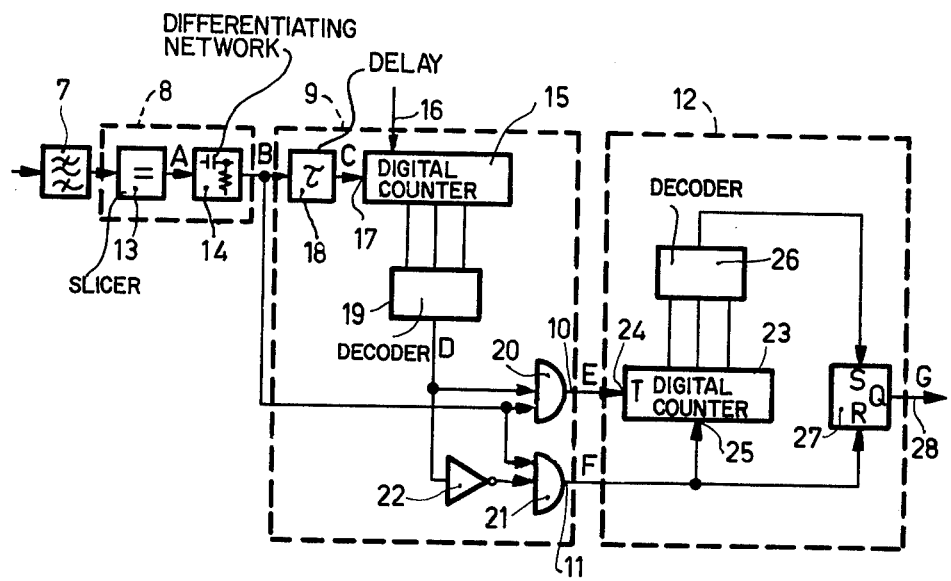
FIG. 6 shows a possible embodiment of the synchronizing-sequence detection circuit in greater detail and FIG. 7A-G shows a number of pulse diagrams for explaining the operation of the detection circuit shown in FIG. 6.

In FIG. 6 which shows in greater detail a possible embodiment of the detection circuit 4 the components which correspond to FIG. 1 have been given the same reference numerals. So this detection circuit comprises also here a bandpass filter 7 which is coupled to the input 5 of the receiver 1, a zero-crossing detector 8 connected to this filter, a pulse interval measuring means 9 connected to the zero-crossing detector and having a first and a second output 10 and 11 respectively and a pulse pattern analyser 12 connected to these outputs.

Figure 5:
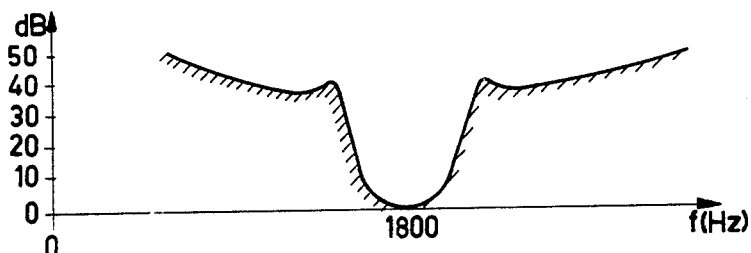
FIG. 5 shows the filter characteristics of the band-pass filter.

The bandpass filter 7 has a filter characteristic as shown in FIG. 5 for selecting a narrow band around the carrier frequency component $f_c$ of 1800 Hz. The zero-crossing detector 8 connected to the output of the filter 7 is constituted by a slicer 13 and a differentiating network 14 connected thereto.

The pulse interval measuring means 9 comprises a digital counter 15 having a first input 16 to which counting pulses are supplied and a second input 17 to which via a delay network 18 the positive zero crossing pulses from zero-crossing detector 8 are applied as resetting pulses. In addition there is connected to the digital counter 15 a decoder 19 which controls a counting range and which, when the count falls within said range supplies an output pulse whose duration is determined by the value of the portion of the count which falls within the range. Further, the pulse interval measuring means 9 comprises the said first and second outputs 10 and 11 respectively which are herein constituted by the outputs of two AND gates 20 and 21 respectively, the AND gate 20 being connected directly and the AND gate 21 via an inverter 22 to the output of the decoder 19, and to which AND gates furthermore the positive zero crossing pulses, from the zero crossing detector, are applied. The pulse pattern analyzer 12 which is connected to said first and second output 10 and 11 respectively of the pulse interval measuring means 9 comprises a digital counter 23 having a first input 24 to which the output pulses which occur at the first output 10 of the pulse interval measuring means 9 are applied as counting pulses and a second input 25 for resetting the counter to its starting position.

In addition, connected to the digital counter 23 there is a decoder 26 which supplies an output pulse when a prescribed pattern consisting of a given number of consecutive counting pulses has been counted. Connected to the decoder 26 there is a bistable element 27 which, in the rest condition of the detection circuit 4, is in a first stable state and which is set to its second stable state by the output pulse of the decoder 26 to be again reset to its first stable state in response to an output pulse occurring at the second output 11 of the pulse interval measuring means 9. The desired starting signal is produced at the output 28 of the bistable element 27. The output pulse produced at the second output 11 of the pulse interval measuring means 9 is also applied as reset pulse to the second input 25 of the digital counter 23.

The operation of the synchronizing-sequence detection circuit will now be explained with reference to the signal shapes shown in FIG. 7A-G.

Figure 7:
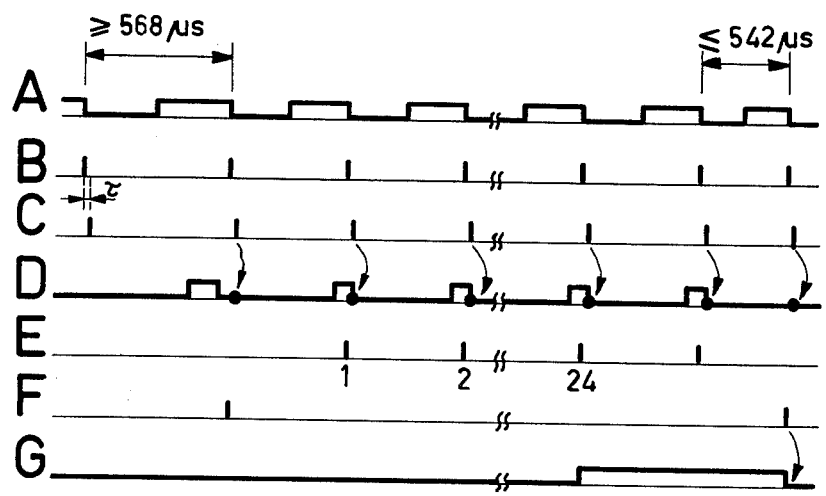

In the rest condition, i.e. when no channel signal is received the counter 23 (FIG. 7) is in the zero state and the bistable element 27 in its first stable state, the signal occurring at its output having a first (low) value as shown in FIG. 7G.

If now, prior to the reception of data signals, a synchronizing sequence is received the line spectrum of the channel signal contains a spectral line at the carrier frequency $f_c = 1800$ Hz which is selected by the bandpass filter 7 and supplied to the slicer 13. The rectangular signal shown in FIG. 7A is then produced at the output of the slicer 13. This rectangular signal is applied to the differentiating network 14. At the output of the differentiating network 14 the zero crossing pulses occur which are shown in FIG. 7B and which coincide with the trailing edges of the rectangular signal shown in FIG. 7A. These zero crossing pulses are supplied to the delay network 18 which, as shown in FIG. 7C, introduces a slight delay $\tau$. The zero crossing pulses thus delayed are applied as resetting pulses to the digital counter 15 which counts the counting pulses supplied to its input 16. The count which is reached by the counter 15 prior to resetting is a measure for the pulse interval between successive resetting pulses and consequently of the duration of a period of the signal of carrier frequency $f_c$ selected by the bandpass filter 7. The decoder 19 connected to the counter 15 surveys a counting range and supplies the output pulses shown in FIG. 7B whose duration is determined by the portion of the count which falls within the counting range. The value of said counting range has on the one hand been chosen so that during the reception of the synchronizing period the counts which are representative for the duration of successive periods of the signal of carrier frequency $f_c$ in spite of the influence of frequency off-set, phase jitter and noise will always fall within this counting range, and on the other hand so that these counts will always fall outside this counting range during the reception of the training period owing to the strong phase fluctuations then occurring.

In the pulse interval measuring means 9 the zero crossing pulses produced at the output of the differentiating network 14 and shown in FIG. 7B are applied to the two AND gates 20 and 21. AND gate 20 is open for the duration of the output pulses (FIG. 7D) of the decoder 19 applied to the control input of AND-gate 20. AND gate 21 is open when AND gate 20 is not. As now the reset pulses which are applied to counter 15 and which are shown in FIG. 7C have a certain delay relative to the zero crossing pulses (FIG. 7B) they are passed by AND gate 20 each time the pulse interval measured by counter 15 is within the counting range. These zero crossing pulses are passed by AND gate 21 each time the measured interval is outside the said counting range.

The zero crossing pulses passed by the AND gate 20 are shown in FIG. 7E, whereas the zero crossing pulses passed by the AND gate 21 are shown in FIG. 7F. The first pulse of the zero crossing pulses shown in FIG. 7E occurs because the first period of the rectangular signal (FIG. 7A) occurring during a synchronizing period at the output of slicer 13 is extended in duration by the transient phenomena of the bandpass filters 2 and 7 that the measured interval is outside the counting range. Although this first pulse of the zero crossing pulses shown in FIG. 7F is applied as reset pulse to the counter 23 and to the bi-stable element 27 this has no effect as the counter 23 and said bi-stable element 27 are already in the reset condition.

As the measured duration of the period during the reception of the training period and the reception of data signals may occasionally fall within the counting range and the reception of the synchronizing period must be determined with certainty it is imperative that as decision criterion it holds that a given number (for example 24) of pulses which successively occur at the first output 10 of the pulse interval measuring means 9 are counted by means of the counter 23. As soon as this counter 23 has counted the number of consecutive pulses used as decision criterion the decoder 26, which is connected to counter 23 produces an output pulse which causes the bi-stable element 27 to change-over to its other stable state wherein the output signal occurring at its output 28 and shown in FIG. 7G, from its first (low) value now assumes its second (high) value, to assume its first value again on command of a pulse produced at the second output 11 of the pulse interval measuring means 9.

The change-over of this output signal from its first (low) value to its second (high) value indicates that the synchronizing period is received and the change-over from its second (high) value to its first (low) value indicates that the training period which follows after the synchronizing period is received.

As the signal of carrier frequency $f_c$ which is selected by means of the bandpass filter 7 suddenly reverses its phase immediately at the beginning of the training period following the synchronizing period and the filters 2 and 7 cannot follow this sudden phase reversal immediately, strong phase fluctuations are produced as a consequence thereof in the rectangular signal produced at the output of the slicer 13 and the zero crossing pulses derived therefrom. This results in that the pulse interval measured by means of the counter 15 falls, immediately at the beginning of the training period, outside the counting range and that, consequently, at the second output 11 of the pulse interval measuring means 9 an output pulse is produced which is supplied as a reset command to the counter 23 and to the bi-stable element 27. As a result bi-stable element 27 returns to its first stable state with the result that the output signal which is produced at its output 28 and shown in FIG. 7G will return from its second (high) value to its first (low) value.

As the reset command is produced already after one single interval measurement at the second output 11 of the pulse interval measuring means 9, more specifically at the start of the training period the moment at which the output signal of the bi-stable element 27 changes from its second (high) value to its first (low) value is a very accurate indication of the instant at which the training period begins.

What is claimed is:

1. A receiver for a data transmission system in which data signals are transmitted in the form of a channel signal which is obtained by means of double sideband quadrature modulation of a carrier wave and in which prior to the data signals a synchronizing sequence is transmitted which comprises a synchronizing period and an immediately subsequent training period for effecting in the receiver an initial synchronization of local oscillators and a correct preadjustment of an adaptive equalizer respectively, the spectrum of the channel signal during the synchronizing period comprising a spectral line at the carrier frequency $f_c$ and two spectral lines located symmetrically relative to $f_c$, said spectrum during the training period comprising a spectral line at the carrier frequency $f_c$ having a phase which is opposite to that of $f_c$ during the synchronizing period and a plurality of spectral lines which are symmetrical relative to $f_c$, which receiver comprises a detection circuit means coupled to the receiver input for generating an output signal which starting from a first value assumes a second value during the reception of the synchronizing period and which again assumes the first value on receipt of the training period and the subsequent data signals, said detection circuit comprising a bandpass filter means for selecting a channel signal component at $f_c$, a zero crossing detector means coupled to said filter for generating output pulses at the zero crossings of said channel signal component, pulse interval measuring means having a first and a second output and being coupled to the zero-crossing detector for measuring the interval between successive output pulses thereof to produce a pulse at said first output each time the length of the interval measured is within a predetermined range and to produce a pulse at said second output each time the length of the interval measured is outside said predetermined range, and a pulse pattern analyzer means coupled to said first and second outputs of the pulse interval measuring means to produce said output signal of said first value which after a prescribed pattern of successive pulses has occurred at least once at the first output of the pulse interval measuring means assumes said second value and which again assumes the first value in response to the occurrence of a pulse at the second output of the pulse interval measuring means.

2. A receiver as claimed in claim 1, wherein the zero-crossing detector comprises a slicer to which the filtered channel signal is applied and a differentiating network which is coupled to an output of the slicer and from which the zero crossing pulses are derived.

3. A receiver as claimed in claim 1, wherein the pulse interval measuring means comprises a delay network coupled to said zero crossing detector, a digital counter having an input to which counting pulses are supplied and a second input coupled to said network to which zero crossing pulses are supplied as resetting pulses, a decoder means coupled to the counter for surveying a predetermined counting range to produce an output pulse when the count falls within or exceeds the said range, the duration of this output pulse being determined by the portion of the count which falls within the range, the first and second outputs of the pulse interval measuring means comprise first and second AND gates, the first AND gate being coupled directly and the second AND gate by an inverter to an output of the decoder and to which AND gates furthermore the zero crossing pulses from the zero crossing detector are applied.

4. A receiver as claimed in claim 1, wherein the pulse pattern analyzer comprises a digital counter having a first input to which the output pulses which occur at the first output of the pulse interval measuring means are supplied as counting pulses, and a second input means for resetting the counter to its initial position, a decoder means coupled to the counter and when a prescribed pattern of successive pulses has been counted produces an output pulse, and a bi-stable element coupled to said decoder which is adjusted to its one stable state by the output pulses from said decoder and to the other stable state by the output pulse produced at the second output of the pulse interval measuring means.

* * * * *